(12) United States Patent
Bonnet et al.

(10) Patent No.: US 10,407,008 B2
(45) Date of Patent: Sep. 10, 2019

(54) METHOD AND DEVICE FOR OPERATING A VEHICLE (71) Applicant: DAIMLER AG, Stuttgart (DE)

(72) Inventors: Christophe Bonnet, Leinfelden-Echterdingen (DE); Andreas Hiller, Stuttgart (DE); Gerhard Kuenzel, Benningen (DE); Martin Moser, Fellbach (DE); Heiko Schiemenz, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 141 days.

(21) Appl. No.: 15/534,067

(22) PCT Filed: Jul. 3, 2015

(86) PCT No.: PCT/EP2015/001361
§ 371 (c)(1),
(2) Date: Jun. 8, 2017

(87) PCT Pub. No.: WO2016/091338
PCT Pub. Date: Jun. 16, 2016

(65) Prior Publication Data
US 2017/0334380 A1 Nov. 23, 2017

(30) Foreign Application Priority Data
Dec. 9, 2014 (DE) .................. 10 2014 018 189

(51) Int. Cl.
*B60R 16/037* (2006.01)
*B62D 1/02* (2006.01)
(Continued)

(52) U.S. Cl.
CPC ....... *B60R 16/037* (2013.01); *B60H 1/00778* (2013.01); *B60N 2/0224* (2013.01);
(Continued)

(58) Field of Classification Search
CPC ...... B60R 16/037; B60N 2/0224; B60Q 1/02; B60T 7/12; B60T 2201/10;
(Continued)

(56) References Cited

U.S. PATENT DOCUMENTS 6,615,132 B1 9/2003 Nagasaka et al.
9,156,497 B2 * 10/2015 Reichel .............. B62D 15/0285
(Continued)

FOREIGN PATENT DOCUMENTS

CN 101412401 A 4/2009
CN 103853490 A 6/2014
(Continued)

OTHER PUBLICATIONS

Machine Translation of DE 10 2013 015348 retrieved from Espacenet on Jan. 6, 2019 (Year: 2019).*
(Continued)

*Primary Examiner* — Thomas Ingram
(74) *Attorney, Agent, or Firm* — Patent Portfolio Builders PLLC (57) ABSTRACT A method for operating a vehicle in at least one parking process situation involves allocating at least one predetermined vehicle-specific or parking process situation-specific function to the at least one predetermined parking process situation of the vehicle. Whether the vehicle is in the at least one predetermined parking process situation is determined and the predetermined vehicle-specific or parking process situation-specific function allocated to the at least one predetermined parking process situation is presented to a vehicle user for activation or automatically activated when the vehicle is in the at least one predetermined parking process situation.

12 Claims, 2 Drawing Sheets

(51) Int. Cl.
  *B62D 15/02* (2006.01)
  *B60H 1/00* (2006.01)
  *B60N 2/02* (2006.01)
  *B60Q 1/02* (2006.01)
  *B60T 7/12* (2006.01)
  *B60J 7/12* (2006.01)

(52) U.S. Cl.
  CPC .................. *B60Q 1/02* (2013.01); *B60T 7/12* (2013.01); *B62D 1/02* (2013.01); *B62D 15/027* (2013.01); *B62D 15/0285* (2013.01); *B60J 7/1204* (2013.01); *B60T 2201/10* (2013.01)

(58) Field of Classification Search
  CPC .............. B60H 1/00778; B62D 15/027; B62D 15/0285; B62D 1/02; B60J 7/1204
  See application file for complete search history.

(56) References Cited

U.S. PATENT DOCUMENTS

| | | | | |
|---|---|---|---|---|
| 2011/0093168 | A1* | 4/2011 | Barth | B62D 15/028 701/41 |
| 2012/0004809 | A1* | 1/2012 | Sasajima | B60K 35/00 701/41 |
| 2014/0088836 | A1* | 3/2014 | Staack | B60R 1/025 701/49 |
| 2015/0203111 | A1* | 7/2015 | Bonnet | B62D 15/027 701/25 |
| 2015/0226146 | A1* | 8/2015 | Elwart | B60K 28/04 701/49 |
| 2015/0329110 | A1* | 11/2015 | Stefan | B62D 15/0285 701/1 |
| 2015/0353080 | A1* | 12/2015 | Mukaiyama | E05B 77/54 701/23 |
| 2016/0185389 | A1* | 6/2016 | Ishijima | B62D 15/0285 701/41 |
| 2017/0008563 | A1* | 1/2017 | Popken | G08G 1/168 |
| 2017/0158240 | A1* | 6/2017 | Joos | B60W 50/08 |

FOREIGN PATENT DOCUMENTS

| | | |
|---|---|---|
| DE | 102007002261 A1 | 8/2008 |
| DE | 102013015348 A1 | 4/2014 |
| DE | 102013015349 A1 | 4/2014 |
| DE | 102012221036 A1 | 5/2014 |
| DE | 102012025317 A1 | 6/2014 |
| JP | H06261420 A | 9/1994 |
| JP | 2000258169 A | 9/2000 |
| JP | 2001307161 A | 11/2001 |
| JP | 2004022179 A | 1/2004 |
| JP | 2005153684 A | 6/2005 |
| JP | 2007008365 A | 1/2007 |
| JP | 2008238861 A | 10/2008 |
| JP | 2008290631 A | 12/2008 |
| JP | 2009101927 A | 5/2009 |
| JP | 2012245936 A | 12/2012 |
| JP | 2013017044 A | 1/2013 |

OTHER PUBLICATIONS

International Search Report dated Sep. 22, 2015 in related International Application No. PCT/EP2015/001361.
Written Opinion dated Sep. 22, 2015 in related International Application No. PCT/EP2015/001361.
Office Action dated May 1, 2018 in related JP Application No. 2017-530048.
Office Action dated Jul. 23, 2018 in related CN Application No. 201580066800.6 (all references from OA not cited herewith have previously been made of record).
Office Action dated Dec. 4, 2018 in related/corresponding JP Application No. 2017-530048 (All references from Office Action not cited herewith have previously been made of record).
Java Program Designing Editorial Board, "Java Program Designing," Aug. 2007, pp. 107, China Planning Press.
Office Action dated Feb. 15, 2019 in related/corresponding CN Application No. 201580066800.6 (references from OA not cited herewith have previously been made or record).

* cited by examiner

METHOD AND DEVICE FOR OPERATING A VEHICLE

BACKGROUND AND SUMMARY OF THE INVENTION

Exemplary embodiments of the invention relate to a method for operating a vehicle and a device for carrying out the method.

A method and device for operating a vehicle, in particular for the vehicle to approach a parking space in a parking zone that is not visible/is away from the road, are known from prior art, as described in German patent document DE 10 2013 015 348 A1. In the method, surroundings data of the vehicle are detected. When approaching a parking space in the parking zone, it is identified whether this is a home parking space or whether the parking zone is a home parking zone. When it is identified that it is a home parking space or a home parking zone and as the vehicle approaches the identified home parking space or the identified home parking zone, detected surroundings data or driving data are stored or updated. In a learning mode, several trajectories for the at least one home parking space of the at least one home parking zone are determined by means of the surroundings data or driving data and stored. In an operating mode, when approaching the at least one home parking space of the at least one home parking zone, possible drivable trajectories are displayed for selection and activation or, when only one of the determined trajectories is drivable, this trajectory is activated automatically.

German patent document DE 10 2013 015 349 A1 discloses a method and device for operating a vehicle for the vehicle to approach a parking space in a parking zone that is not visible/is away from the road. In the method, surroundings data of the vehicle are detected. When approaching a parking space in the parking zone, it is identified whether this is a home parking space or whether the parking zone is a home parking zone. When it is identified that it is a home parking space or a home parking zone and as the vehicle approaches the identified home parking space or the identified home parking zone, detected surroundings data or driving data are stored or updated.

Exemplary embodiments of the invention are directed to an improved method for operating a vehicle compared to the prior art and a device for carrying out the method.

In a method for operating a vehicle in a parking process situation, a predetermined vehicle-specific or parking process situation-specific function is allocated according to the invention to a predetermined parking process situation of the vehicle. It is determined whether the vehicle is in the one predetermined parking process situation. When the vehicle is in the one predetermined parking process situation, the allocated function is presented to a vehicle user for activation or is automatically activated.

The method increases the comfort for the vehicle user since the vehicle-specific or parking process situation-specific functions, which are formed, in particular, as additional functions of the vehicle, can be automatically activated by means of the method or can be presented to the vehicle user for activation, and indeed in each case, at a time point that is beneficial to the vehicle user, since they are allocated to the respective parking process situation in which the activation of the respective vehicle-specific or parking process situation-specific function is beneficial and advantageous, or at least could be. In this way, it is no longer necessary for the vehicle user to, in each case, call up these vehicle-specific or parking process situation-specific functions individually, to then individually activate them by activating a special switch for the respective function or to find the respective function in a sub-menu of a central operating system of the vehicle. Because modern vehicles have a large number of such additional functions, the method presents a considerable simplification for the vehicle user for beneficial use of these additional functions, and, in addition, enables the vehicle user to save time. The additional functions become easier to operate and, in addition, an improved visibility of additional functions that are only seldom used, i.e., by means of the method, the vehicle user is made aware of additional functions that are available to him in a respective parking process situation such that he can also use these additional functions in a beneficial manner, which can only be seldom used and which can thus be easily forgotten by the vehicle user.

The method is suitable both for parking process situations in which the vehicle user manually carries out a parking process in a conventional manner, for example parking the car or pulling away, and for parking process situations in which the respective parking process is carried out partially or completely automatically by the vehicle. Particularly advantageously, the method is also suitable for parking process situations in which the respective parking process is carried out as a so-called remote parking, i.e., the vehicle user, in particular the vehicle driver, is positioned outside the vehicle and initiates, controls, regulates or monitors the respective parking process by means of a remote control unit, which is preferably connected to the vehicle via a wireless data transfer connection. Thus, the method is particularly advantageous because the vehicle user located outside the vehicle cannot individually call up the vehicle-specific or parking process situation-specific functions in the conventional manner described above, cannot individually activate them by activating a special switch in the vehicle or cannot find them in a sub-menu of a central operating system of the vehicle. The predetermined vehicle-specific or parking process specific-function allocated to the respective predetermined parking process situation is thus advantageously either automatically activated or expediently presented to the vehicle user for activation via the remote-control unit, when the vehicle is in the respective predetermined parking process situation.

Advantageously, the allocation of the one predetermined vehicle-specific or parking process situation-specific function to a predetermined parking process situation is carried out in a training process, wherein the training process comprises one or more of the following steps:

storing the parking process situation, i.e., in particular when the vehicle is in the respective parking process situation, and storing an activation carried out in this parking process situation of a vehicle-specific or parking process situation-specific function in a learning mode activated by the vehicle user, wherein this can also be carried out several times by the vehicle user. In doing so, the operation by the vehicle user, for example, and the parking process situation can be thus recorded together after activating the learning mode and stored.

storing the activations of a vehicle-specific or parking process-specific function in a parking process situation. In doing so, e.g., the activation time point or the activation time point of a vehicle-specific or parking process situation-specific function for a certain parking process situation is stored. Activating or changing the function can be allocated by means of operation by the vehicle user or automatically for a determined or recognized parking process situation.

storing the parking process situation that has occurred several times as well as an activation of a vehicle-specific or parking process situation-specific function carried out every time the parking process situation occurs. In doing so, a continuous learning of the operation is thus advantageously automatically carried out by the vehicle user when a parking process situation that appears several times occurs, in particular when carrying out a parking situation used several times.

predetermining a parking process situation and an allocated vehicle-specific or parking process situation-specific function and storing these predeterminations. For example, advantageously setting desired settings is carried out by the vehicle user in a menu for a respective parking process situation and storing these desired settings along with the parking process situation, i.e., the vehicle user advantageously selects both the parking process situation and, where necessary, these characterizing criteria and the settings desired for this parking process situation in terms of one or more vehicle-specific or parking process situation-specific functions, for example from the menu or in a different manner, and stores them together. In particular, a combination of the first and third or the second and third variants is also possible. This setting does not necessarily take place in the car. This can also take place from home via a (web) server. In other words, the setting can take place as part of a remote configuration. The driver configures the presented additional functions on his PC at home.

Furthermore, learning new activations or changes to activations can also take place in a normal operation or operating mode. In other words, activation can be continuously learned. A specific training process does not have to exist for this.

It is also conceivable that learning the activation of a function occurs independently of learning the parking process situation; the vehicle has learned the garage in front of the house is a relevant parking process situation and has also already sufficiently stored the trajectories. Later, the vehicle then still learns that the driver, when (partially) automatically driving away from the situation, activates the garage door opener again and again or, in the end, activates the parking heater again and again for the next day.

Determining whether the vehicle is in the at least one predetermined parking process situation and, if this is the case, presenting for activation or automatically activating the predetermined vehicle-specific or parking process-specific function allocated to this one predetermined parking process situation, takes place in a normal operation or operating mode or operating process of the vehicle.

In an advantageous embodiment of the method, one or more parameters used most frequently in the past in the predetermined parking process situation of the vehicle-specific or parking process-specific function is presented to the vehicle user for activation when the vehicle is in the at least one predetermined parking process situation. In other words, the vehicle user is not only presented with the activation of the vehicle-specific or parking process situation-specific function, but also the activation of the function with a parameter frequently used in the past for the function in the respective parking process situation, and labelled as default values such that the vehicle user can set the desired expression of the function in a simple and quick manner. Alternatively, as already described above, for example only activating the vehicle-specific or parking process situation-vehicle function or several of these functions can also be presented to the vehicle user. This can take place, for example, by means of the so-called shortcut in the operating system of the vehicle that can then be displayed to the vehicle user for activation such that the vehicle user does not have to look for the respective function in a sub-menu of the central operating system.

As previously mentioned, this presenting of the activation or presenting the parameters available for activation is particularly advantageous with remote parking described above since, when the vehicle user is located outside the vehicle, the usual operating elements of the vehicle for the respective vehicle-specific or parking process-specific functions are not available. In this case, a corresponding shortcut or a different activation possibility or the parameters able to be activated can, for example, be displayed on the remote-control unit. Furthermore, as described above, the automatic activation of the vehicle-specific or parking process situation-specific function is also possible, in particular in the configuration saved for the respective parking process situation, i.e., with the saved parameterization.

In an advantageous embodiment of the method, the predetermined vehicle-specific or parking process-specific function allocated to the one predetermined parking process situation is activated after a confirmation by the vehicle user, i.e., this confirmation by the vehicle user is required and the activation takes place only after the confirmation by the vehicle user. In this way, an activation that is not desired by the vehicle user is avoided. For this purpose, a query, i.e., a request, expediently takes place to the vehicle user whether the activation of the one predetermined vehicle-specific or parking process situation-specific function that is allocated to the respective parking process situation in which the vehicle currently is, is desired by the vehicle user.

Advantageously, the predetermined parking process situation is characterized by one or more of the following criteria:

position of the vehicle,
time point or time period of the parking process situation,
vehicle user identification,
position of the vehicle user,
at least one piece of current or predicted weather information,
at least one piece of vehicle surroundings information,
parking trajectory.

The position of the vehicle can, for example, be determined via a satellite-aided global position determining system, for example GPS, or by means of a surroundings detection device of the vehicle or in a different way. Thus, it can be determined, for example, by means of the position whether the vehicle is close to a home parking space or a frequently used parking space or is in such a parking space. The parking space can also be formed as a garage, for example. The identification of the vehicle user can, for example, take place via detection by a personal unit of the vehicle user, for example via detection by a mobile telephone or a personalized vehicle key or a different authentication unit allocated to a respective vehicle user. The position of the user, in particular relative to the vehicle, can also be determined, for example, via the detection of the personal unit of the vehicle user or also, for example, by means of the position of a common vehicle access unit, for example a so-called radio key. In this way, it is possible, for example, to determine whether the vehicle user is in the vehicle or outside the vehicle and close to the vehicle and thus in data transfer range to the vehicle. Furthermore, the position of the vehicle user, for example, can also be determined via the satellite-aided global position determining system, for example by means of the personal unit of the vehicle user, for example by means of his mobile telephone. Weather information can be determined, for example, by means of sensors of the vehicle or by a connection to a weather service. Vehicle surroundings information can be determined, for example, by means of the surroundings detection device of the vehicle that expediently comprises one or more sensors, for example an ultrasound sensor, a Lidar sensor, a radar sensor or a camera, for example a stereo camera. The parking trajectory can, for example, be a parking trajectory that is currently being driven or a saved parking trajectory that is currently being retrieved. By establishing one or more of these criteria, it can be established with a great degree of accuracy whether the vehicle is in the respective predetermined parking situation, such that the at least one vehicle-specific or parking process-specific function allocated to this respective parking situation is reliably provided.

Preferably, the following is allocated to the predetermined parking process situation as a predetermined vehicle specific or parking process specific function:

activating a locking device of a parking space, for example opening or closing a garage door, opening or closing a barrier or a different locking device. The activation takes place by means of a device installed in the vehicle or a remote control. For example, by means of a garage door opener that is preferably coupled to the vehicle and is thus able to be operated by a device of the vehicle. Activation can also take place by means of an identification of the vehicle user, for example via a wireless data transfer connection, activating a heating device of the vehicle, for example a seat heating device of a vehicle seat of the vehicle, activating an air-conditioning device of the vehicle, activating a ventilating device of the vehicle, for example a ventilating device of a vehicle seat of the vehicle, activating a lighting device of the vehicle or activating a delay of the deactivation of the lighting device, for example for lighting the surroundings for the vehicle user who is away from the vehicle, setting a predetermined parameter t of a drive train component or a brake device of the vehicle. By means of this setting, an engine noise, for example, of the vehicle can be reduced in the predetermined parking process situation, for example when starting the engine in the morning or the evening. This sound reduction when starting the engine is also called a silent start. With a vehicle formed as a hybrid vehicle, in such a parking process situation, only one electric drive motor of the vehicle, for example, can be activated such that the vehicle leaves the parking process situation particularly quietly and an internal combustion engine of the vehicle is only connected thereafter.

The brake device can be activated, for example, and set to correspond to the predetermined parameters in order to implement a parking brake function of the parked vehicle or in order to specifically delay the vehicle in the predetermined parking situation or to bring it to a complete stop, for example with a partially or fully automatic parking procedure that should be interrupted in at least one predetermined position in order to wait for a locking device of the parking space to open, for example a barrier or a garage door or a pivoting door.

activating a parking heater of the vehicle or setting a parameter of the parking heater, for example a time point of activating the parking heater, activating a covering mechanism of the vehicle, for example a convertible. Then, the cover is opened or closed, for example, in the predetermined parking process situation.

activating an adjusting mechanism of a window element of the vehicle, for example opening or closing a side window or a sliding roof/sunroof of the vehicle.

activating a predetermined seat adjustment of a vehicle seat of the vehicle, for example adjusted to the respective vehicle user. One criterion for characterizing the parking process situation is then expediently the identity of the respectively present vehicle user.

activating a predetermined mirror adjustment of a rear-view mirror of the vehicle, also, analogously to the seat adjustment, adjusted to the respective vehicle user. One criterion for characterizing the parking process situation is then expediently the identity of the respectively present vehicle user.

activating a locking system of the vehicle, i.e., locking or unlocking the vehicle, activating or deactivating a prepared state of the vehicle, for example after establishing the presence of the vehicle user, for example via the detection of a person-related unit.

The functions described above are a selection of particularly advantageous functions that can be activated based on the parking process situation by means of the method or can be presented to the vehicle user for activation to realize the advantages of the method already described above in this manner.

Advantageously, a wireless data transfer connection is used for determining the one predetermined parking process situation or for activating the one predetermined vehicle-specific or parking process-specific function. For example, this can be a radio connection, a WLAN connection, a mobile communication connection, or a wireless data transfer connection to a vehicle key, for example via radio. Other wireless data transfer connections, for example by means of infrared, are also possible. When using remote parking with which, as already explained, the vehicle user is positioned outside the vehicle and the respective parking process initiates, controls, regulates or monitors by means of a remote-control unit, which is preferably connected to the vehicle via a wireless data transfer connection, this wireless connection can also be used advantageously to determine the one predetermined parking process situation or, in particular, to activate the one predetermined vehicle-specific or parking process-specific function.

With a multitude of available, wireless data transfer connections that are available for the at least one predetermined parking process situation, the data transfer connection most suited to the one predetermined parking process situation is advantageously used. This can, for example, be currently determined in each case; however, particularly preferably, the data transfer connection most suited to the predetermined parking process situation is allocated to the respective predetermined parking process situation or the respective vehicle-specific or parking process-specific function and saved. This avoids the respective vehicle-specific or parking process-specific function not being activated or not being presented to the vehicle user for activation because one of the possible data transfer connections is not functioning in the respective parking process situation.

In an advantageous embodiment of the method, activating the predetermined vehicle-specific or parking process-specific function is delayed until a predetermined condition is met. Thus, activating the vehicle-specific or parking process-specific function, for example, at a time point or at a certain location is planned for which there is no wireless data transfer available because the vehicle is parked in a garage, for example. The predetermined parking process situation then emerges expediently at an earlier time point in which the vehicle is still in front of the garage. The vehicle-specific or parking process-specific function is then expediently presented to the vehicle user at this earlier time point. When the vehicle user activates it, it is, however, preferably temporally delayed or delayed in a position curve of the vehicle and only carried out at a later time point or in the later position of the vehicle. The predetermined condition for which the activation is then effective, i.e., for which the function is carried out, is then, for example, a predetermined point in time, a predetermined period of time because the activation by the vehicle user or a predetermined position of the vehicle. The user bringing the activation command forward and delaying carrying out the function prevents carrying out the function at a time point in which it is provided to be carried out cannot be activated and thus be avoided.

In a particularly advantageous embodiment, several predetermined vehicle-specific or parking process-specific functions are allocated to the predetermined parking process situation of the vehicle in such a way that at least some of these predetermined vehicle-specific or parking process-specific functions are presented to the vehicle user for activation or are automatically activated one after another in several steps during the course of the predetermined parking process situation, when the vehicle is in the predetermined parking process situation. In this way, several functions at different positions or at different time points of a parking process duration are not allocated to different parking process situations that have to each be individually learned and all conditions are to be individually checked for their occurrence in later parking processes; instead, it is a whole parking process situation that has to be learned in its entirety and whose functions are activated one after another or are presented to the vehicle user for activation when it is detected that the vehicle is in this parking process situation.

Furthermore, in this embodiment of the method as well, one or more predetermined vehicle-specific or parking process-specific functions can be presented to the vehicle user at an earlier point in time or in an earlier position of the vehicle; however, after their activation, they are not carried out immediately, but rather at a later time point or in a later position of the vehicle. As in the case described above, the activation of the vehicle-specific or parking process-specific functions are also planned here at a time point in which there is no wireless data transfer connection available because the vehicle is parked, for example in a garage. The predetermined parking process situation then expediently already occurs at an earlier time point in which the vehicle is still in front of the garage. The vehicle-specific or parking process-specific function is then advantageously presented to the vehicle user at this earlier time point. When the vehicle user activates it, it is, however, preferably temporally delayed or in a position curve of the vehicle and only carried out at a later time point or in the later position of the vehicle.

A device according to the invention is formed and, in particular, adapted to carry out the method described above. In particular, at least one predetermined vehicle-specific or parking process-specific function is able to be allocated to the at least one predetermined parking process situation of the vehicle by means of the device. Furthermore, it can be determined whether the vehicle is in the at least one predetermined parking process situation, and the predetermined vehicle-specific or parking process-specific function that is allocated to this at least one predetermined parking process situation is able to be presented to a vehicle user for activation or is able to be automatically activated when the vehicle is in the at least one predetermined parking process situation. In particular, the device comprises a storage unit for storing the at least one predetermined parking process situation of the vehicle and the at least one predetermined vehicle-specific or parking process-specific function allocated to this.

BRIEF DESCRIPTION OF THE DRAWING FIGURES

Exemplary embodiments of the invention are illustrated in greater detail below by means of drawings.

Here are shown.

Parts that correspond to one another are provided with the same reference numerals in all figures.

DETAILED DESCRIPTION

Figure 1:
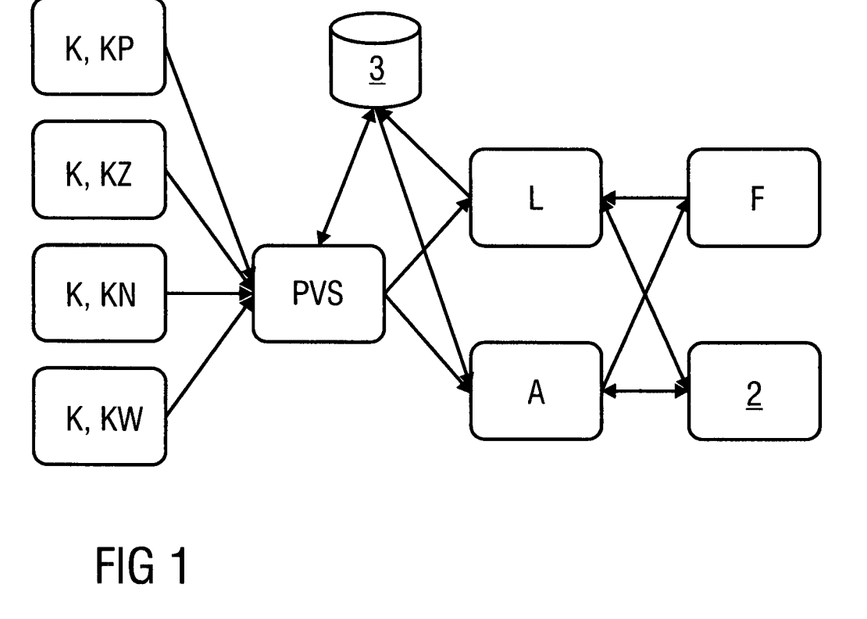
FIG. 1 a schematic depiction of possible method procedures in a method for operating a vehicle in at least one parking process situation, FIG. 2 a schematic depiction of two parking process situations of a vehicle, FIG. 3 schematically, a depiction of a further parking process situation of a vehicle in a perspective depiction, and FIG. 4 schematically, a depiction of a further parking process situation from FIG. 3 in a top view from above.

FIG. 1 shows a schematic depiction of possible method procedures in a method for operating a vehicle 1 in at least one parking process situation PVS. In this method, at least one predetermined vehicle-specific or parking process-specific function F is allocated to at least one predetermined parking process situation PVS of the vehicle 1. This advantageously takes place in a training process L. The allocation can also take place in the form of continuous learning. Furthermore, expediently at a later time point, in a normal operation, operating mode or operating process of the vehicle, it is determined whether the vehicle 1 is in the at least one predetermined parking process situation PVS. If this is the case, i.e., if the vehicle 1 is in the at least one predetermined parking process situation, then the predetermined vehicle-specific or parking process-specific function F allocated to this at least one predetermined parking process situation PVS is presented to a vehicle user N for activation or is automatically activated.

Modern vehicles 1 have a multitude of functions, in particular so-called additional functions, such as a garage door opener, for example, a convertible roof control in a convertible, electric windows, a mirror or seat control or a so-called silent-start function that, depending a respective motor variant, for example set parameters of a motor in such a way that they result in as small a noise development as possible, or for example in a hybrid vehicle, initially only an electric motor of the vehicle 1 starts and a combustion engine is only switched on later when the vehicle 1 has moved out of a residential area in order to avoid an unnecessary disturbance for other people. In vehicles 1 and methods implemented therein, according to prior art, these functions must be individually activated by hand in parking process situations PVS by the vehicle user N, in particular the vehicle driver. The functions can be activated by the vehicle user N, for example, by means of switches respectively provided here and suited to the function, or by selection via menus of a central operating system 2 of the vehicle 1. Other functions, for example a so-called delay of a lighting device of the vehicle 1, i.e., a time-delayed switching-off of the lighting device after parking the vehicle 1 to light a footpath of the vehicle user N, are always activated, even when the vehicle user N does not deem them to be necessary.

One or more predetermined vehicle-specific or parking process-specific functions F can be allocated to different predetermined parking process situations PVS and can be stored in a storage unit 3 of a device 4 that is formed and, in particular, designed to carry out the method. The parking process situation PVS can then be recognized by means of one or more criteria K characterizing it, for example by means of a position KP of the vehicle 1, a respective time point KZ, or detecting the presence of a person-related unit of a respective vehicle user N, for example a personalized vehicle key or a mobile telephone of the respective vehicle user N, by means of which a vehicle user identification KN is possible. Thus, a key card, access card or identification card, for example, or similar is also to be understood by the term vehicle key as identification means for ensuring an access to the vehicle 1 by means of a keyless access system. Further such criteria K are a parking trajectory KT, in particular a trajectory for pulling in or pulling away, chosen in or for the parking process situation PVS, vehicle surroundings information or weather information KW, for example. Vehicle surroundings information can, for example, be determined by means of one or more sensor units of the vehicle 1 that, advantageously, are also a component of the device 4 for carrying out the method. For example, these sensor units are a component of a surroundings detection device of the vehicle 1 or the device 4. These sensor units can, for example, be formed in each case as a radar sensor, Lidar sensor, ultrasound sensor or camera, for example stereo camera. A combination of several of the same or different sensor units is also possible. Weather information KW can be detected by means of sensors of the vehicle 1, for example, or by transmitting a weather service. The weather information KW can be current values or predicted future values.

If such a predetermined parking process situation PVS is recognized, the vehicle-specific or parking process-specific functions F respectively allocated to the respective parking process situation PVS are available to the vehicle user N. For example, they are automatically activated, where appropriate after a request and corresponding confirmation by the vehicle user N, or they are presented to the vehicle user N for activation. Thus, an easier operability of these functions, in particular additional functions, of the vehicle 1 and an improved comfort for the vehicle user N is achieved and, furthermore, a better visibility of functions that are seldom used is achieved, i.e., such functions F are also presented to the vehicle user N for activation in the respective parking process situation PVS or these are automatically activated, the vehicle user N is no longer aware of the availability of these functions as they are seldom used.

Figure 2:
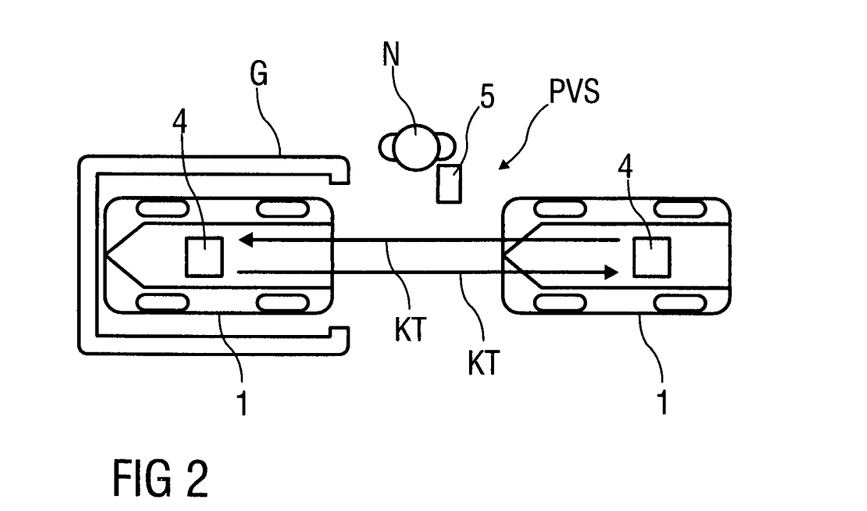

Particular advantageously, the method is also suitable for parking process situations PVS in which the respective parking process is carried out as a so-called remote parking, as shown in FIG. 2, for example. In other words, the vehicle user N, in particular the vehicle driver, is positioned outside the vehicle 1 and initiates, controls, regulates or monitors the respective parking process by means of a remote-control unit 5 that is preferably connected to the vehicle 1 via a wireless data transfer connection. To do so, the method is particularly advantageous since the vehicle user N positioned outside the vehicle 1 cannot individually call up the vehicle-specific or parking process-specific functions F, in each case, in the usual manner described above, cannot individually activate them by activating special switches in the vehicle 1, or cannot search in a sub-menu of the central operating system 2 of the vehicle 1. Thus, the predetermined vehicle-specific or parking process-specific function F that is allocated to the respective predetermined parking process situation PVS is advantageously either automatically activated or expediently presented to the vehicle user N for activation via the remote-control unit when the vehicle 1 is in the respective predetermined parking process situation PVS.

In the following, possible method procedures in this method for operating the vehicle 1 in at least one parking process situation PVS are explained by means of FIG. 1. As already explained and shown in the exemplary embodiment depicted in FIG. 1, the respective parking process situation PVS is characterized, for example, by the criteria K position KP, time point KZ, vehicle user identification KN and weather information KW. These criteria K only present one possible selection. Alternatively, further or different criteria K for characterizing the respective parking process situation PVS are possible. The parking process situation PVS is stored in the storage unit 3 of the device 4 for carrying out the method and, with a renewed determination of the criteria K that characterize the parking process situation PVS, is again called up from the storage unit 3. In the training process L, activations of the central control system 2 of the vehicle 1 occurring during the parking process situation PVS and the resulting triggering of the respective vehicle-specific or parking process-specific function F are determined, allocated to the parking process situation PVS, and stored together with this in the storage unit 3. With a renewed determination of the criteria K characterizing the parking process situation PVS, calling up the stored vehicle-specific or parking process-specific function F or functions F that are allocated to the parking process situation PVS takes place such that this/these is/are either automatically activated or is/are presented to the vehicle user N for activation by means of the central operating system 2.

In the following, an exemplary course of the method is described in more detail in an exemplary typical usage scenario by means of FIG. 2. In this typical usage scenario, the vehicle user N comes in front of his garage with the user's vehicle 1 or, in other examples, to another predetermined parking positions, for example to a private/personal parking space. In the training process L of the method, the criterion K for the predetermined parking situation PVS are now determined and the vehicle-specific or parking process situation-specific functions F are predetermined that are to be activated in this predetermined parking process situation PVS or presented to the vehicle user N for activation. The predetermined parking process situation PVS is the vehicle 1 pulling into the garage G. Here, at least the position KP of the vehicle 1 in front of the garage G is determined as a criterion K for characterizing the predetermined parking process situation PVS and stored. Additionally, further criteria K can be determined and stored to characterize the predetermined parking process situation PVS as comprehensively and exactly as possible and thus to later avoid erroneously recognizing the predetermined parking process situation PVS.

In front of the garage, the vehicle user N uses a garage door opener with a determined storage position to open a garage door of the garage G, i.e., the vehicle user N activates a locking device of a parking space with the garage door opener, namely the garage door of the garage G. In this example, the vehicle 1 is a convertible. Thus, the vehicle user N further activates a covering mechanism of the vehicle 1 in front of the garage G to close a convertible roof of his vehicle 1. When reaching the target position in the garage G and getting out of the vehicle 1, a lighting device of the vehicle 1 is activated to obtain a delay of the lighting. When the vehicle user N is outside the vehicle 1 and the garage G, the vehicle 1 is locked, i.e., the locking system of the vehicle 1 is activated to lock it, and the garage door is closed by the corresponding command of the garage door opener from the vehicle user N, i.e., the locking device of the parking space, here the garage door of the garage G, is activated to lock it. These activities are detected in the training process L, allocated to the predetermined parking process situation PVS as vehicle-specific or parking process-specific functions F, and stored in the storage unit 3.

When the vehicle 1 subsequently approaches the garage G, the presence of the predetermined parking process situation PVS is advantageously determined at least using the criterion K of the position KP of the vehicle 1 in front of the garage G. In other words, by determining the position KP of the vehicle 1 in front of the garage G that has been set in the training process L as the criterion K that characterizes the predetermined parking process PVS, it is determined that the vehicle 1 is in the predetermined parking process situation PVS. During the following pulling-in process into the garage G, i.e., during the predetermined parking process situation PVS, now the support of the vehicle user N occurs by the method by activating or presenting the activating of the different predetermined vehicle-specific or parking process situation-specific functions F that are allocated to this parking process situation PVS. In the depicted example, as this has been saved in the training process L, this takes place in three steps.

In front of the garage, the locking device of the parking space, i.e., the garage door of the garage G, is now automatically activated by means of the garage door opener as the vehicle-specific or parking process-specific function F, i.e., the garage door opener is controlled by the device 4 to activate a drive of the garage door and to open the garage door. Alternatively, this vehicle-specific or parking process situation-specific function F of the activation of the locking device of the parking space is presented to the vehicle user N, for example as an input of the central operating system 2 of the vehicle 1 to be directly selected that is coupled to the garage door opener. Such an input to be directly selected is also known as a shortcut. Additionally, the covering mechanism is activated as a further vehicle-specific or parking process situation-specific function F or is presented to the vehicle user N for activation to close the convertible roof of the vehicle 1 formed as a convertible.

In the next step, the lighting device of the vehicle 1 is activated or presented to the vehicle user N for activation on reaching the target position in the garage G and when the vehicle user N gets out of the vehicle 1 to achieve the delay of the lighting. In the next step, when the vehicle user N is outside the vehicle 1 and the garage G, the locking system of the vehicle 1 is activated or presented to the vehicle user N for activation as a further vehicle-specific or parking process situation-specific function F to lock the vehicle 1, and furthermore, the locking device of the parking space, here the garage door of the garage G, is activated or presented to the vehicle user N for activation as a vehicle-specific or parking process situation-specific function F to close the garage door by the corresponding command of the garage door opener.

The pulling-away process out of the garage G can still belong to this parking process situation PVS or can form its own parking process situation PVS. The corresponding vehicle-specific or parking process situation-specific functions F are correspondingly additionally learned in the training process L described above and are allocated to the parking process situation PVS described above, or a new parking process situation PVS for pulling away out of the garage G is predetermined and these vehicle-specific or parking process-specific functions F described below in more detail are allocated to this new parking process situation PVS in a corresponding training process L and are d.

During the pulling-away process, the vehicle user N who is outside the garage G activates the vehicle 1, i.e. he activates a prepared state of the vehicle 1, for example. The vehicle 1 is locked, i.e. the locking system of the vehicle 1 is activated, and the garage door is opened by the suitable stored command of the garage door opener, i.e. the locking device of the parking space is reactivated. The vehicle user N gets into the vehicle 1. At a corresponding temperature, he activates a seat ventilation or a seat heating, i.e. the ventilating device or heating device of the vehicle 1 in the form of the seat ventilation or seat heating, and additionally a climate control device of the vehicle 1, for example. Subsequently, the vehicle 1 reaches a point outside the garage G. The vehicle user N closes the garage door, i.e. he activates the locking device of the parking space, and, depending on the weather, opens the convertible roof by activating the covering mechanism of the vehicle 1. These activities are detected in the training process L, allocated to the predetermined parking process situation PVS as vehicle-specific or parking process-specific functions F and stored.

During a subsequent pulling-away process out of the garage G, the support of the vehicle user N now takes place by the method by activating or presenting the activation of the different predetermined vehicle-specific or parking-process specific functions F that are allocated to this parking process situation PVS, as these has been saved in the training process L. The vehicle 1 is automatically activated, i.e., the prepared state of the vehicle 1 is activated, or this is presented to the vehicle user N for activation. The vehicle 1 is automatically locked, i.e., the locking system of the vehicle 1 is activated, or this is presented to the vehicle user N for activation. The garage door is automatically opened by the suitable saved command of the garage door opener, i.e., the locking device of the parking space is reactivated to open the garage door, or this activation is presented to the vehicle user N. The vehicle user N gets into the vehicle 1. At a corresponding temperature that has been set and stored as a criterion K in the learning mode, the air-conditioning device or heating device of the vehicle 1 in the form of the seat ventilation or seat heating, and additionally the climate control device of the vehicle 1, is automatically activated or this is presented to the vehicle user N for activation. Subsequently, the vehicle reaches a point outside the garage G. Now, the locking device of the parking space is automatically activated to close the garage door or this is presented to the vehicle user N for activation and, depending on the weather, corresponding to the weather information KW stored in the training process L, the covering mechanism of the vehicle 1 is automatically activated or this activation is presented to the vehicle user N to open the convertible roof of the vehicle 1. Presenting the respective activation also takes place here as a so-called shortcut in the central operating system 2 of the vehicle 1, for example, or as an input to be chosen in the remote-control unit 5, for example.

Thus, the occurrence of the respective predetermined parking process situation PVS is recognized by the method, wherein a particularly preferred criterion K for characterizing the respective predetermined parking process situation PVS is the respective position KP of the vehicle 1. If this position KP of the vehicle 1 that belongs to the respective predetermined parking process situation PVS and is stored is subsequently re-determined, then it is thus recognized that the vehicle 1 is in the parking process situation PVS allocated to this position KP. The position determination can be determined by a suitable position determining method, for example by a satellite-support global position determination system, for example GPS. Additionally, a chosen parking trajectory KT, for example, in particular a trajectory of pulling in or pulling away, the parking position and thus the parking process situation PVS is determined in more detail, for example to decide which garage door must be opened.

Additionally, a time point KZ, in particular the time of day, can characterize the parking process situation PVS in more detail as a criterion. The vehicle-specific or parking process-specific function F, for example, is then allocated to a parking process situation PVS characterized in this way that an adjustment of at least one predetermined parameter of at least one drive train component of the vehicle 1 is activated or is presented to the vehicle user N for activation. For example, in a hybrid vehicle, only an electric drive motor of the vehicle 1 is used or a noise reduction when starting a combustion motor of the vehicle 1 takes place, also called a silent start. In this way, the vehicle 1 is switched to a quieter driving mode late at night or early in the morning. Additionally, the vehicle user identification KN occurring via the determination of the presence of a person-related unit of a respective vehicle user N, for example a personalized vehicle key or a mobile telephone of the respective vehicle user N, can serve as the criterion K that characterizes the parking process situation PVS in more detail, for example to adjust a seat position by activating a predetermined seat adjustment.

Additionally, vehicle surroundings information or current or predicted weather information KW, for example temperature, light or rain, as criteria K, can characterize the parking process situation PVS in more detail, for example to activate the seat climate control, i.e., a heating device or ventilation device of the vehicle 1 in the form of the seat heating or seat ventilation. The weather information KW can be weather data, for example, from a weather service that reaches the vehicle 1 via a radio interface. This weather information KW as a criterion K that characterizes the parking process situation PVS in more detail can serve to activate the covering mechanism, for example, to open the convertible roof or to activate a parking heater of the vehicle 1 or to set at least one parameter of the parking heater to set the parking heater for the next day, for example.

In a parking process situation PVS, in each case one or more predetermined vehicle-specific or parking process-specific functions F can be activated or presented for activation by means of the method, for example in different stages or steps of the parking process situation PVS. In a first step, for example in front of the target position on reaching a so-called home zone or home parking zone, the covering mechanism of the vehicle 1 can be activated as vehicle-specific or parking process-specific function F in a vehicle 1 formed as a convertible in order to close the cover, the locking device of the parking space can be activated, for example, to open the garage door or setting at least one predetermined parameter of at least one drive motor component can be activated, for example, in order to switch to quiet driving, for example by activating the electric drive motor and deactivating the combustion motor in a hybrid vehicle.

In a further step, one or more further predetermined vehicle-specific or parking process-specific functions F can, for example, be activated or presented for activation on reaching the target position. In a further step, when locking the vehicle 1 in the target position from the outside, further predetermined vehicle-specific or parking process-specific functions F can be activated or presented for activation, wherein locking the vehicle 1, i.e., activating the locking system of the vehicle 1, can already be such a predetermined vehicle-specific or parking process specific function F.

In a further step, for example when locking the parked vehicle 1, further predetermined vehicle-specific or parking process-specific functions F can be activated or presented for activation, wherein locking the vehicle 1, i.e., activating the locking system of the vehicle 1, can already be such a predetermined vehicle-specific or parking process situation-specific function F. In a further step, for example when starting at the parking position, further predetermined vehicle-specific or parking process situation-specific functions F can be activated or presented for activation, for example activating the seat climate control, i.e., activating a heating device or ventilation device of the vehicle 1 in the form of the seat heating or seat ventilation.

In a further step, for example when leaving the home zone or home parking zone, further predetermined vehicle-specific or parking process situation-specific functions F can be activated or presented for activation, for example, the cover mechanism of the vehicle 1 can be activated in a vehicle 1 formed as a convertible in order to open the cover, the locking device of the parking space, for example, can be activated in order to close the garage door or setting the at least one predetermined parameter of the at least one drive motor component, for example, can be activated in order to switch to quiet driving, for example by activating the electric drive motor and deactivating the combustion motor in a hybrid vehicle.

In a parking process carried out by means of the remote-control unit 5, also called remote parking, predetermined vehicle-specific or parking process specific functions F that are different from the steps described above and are to be activated or presented for activation in these steps coincide, for example reaching the target position and locking on the target position from outside or locking the parked vehicle 1 and starting on the parking position.

With which predetermined vehicle-specific or parking process situation-specific functions F, in particular additional functions of the vehicle 1, and in what manner the method should support the vehicle user N can be learned in a different manner. One possibility is recording at least one operation by the vehicle user N after the vehicle user N has activated a learning mode, for example also many times in one position KP, to allocate this operation to the parking process situation PVS as a predetermined vehicle-specific or parking process-specific function F said parking process situation PVS being characterized by this position KP. A further possibility is continuously learning the operation by the vehicle user N automatically on reaching a parking process situation PVS that is used multiple times. A further possibility is the vehicle user N setting the desired settings to a respective parking process situation PVS in a menu, for example of the central operating system 2. Here, it is also possible, for example, to combine the first and the third possibility or the second and the third possibility.

For the method to support the vehicle user N, different variants are possible, for example shortcuts to the predetermined vehicle-specific or parking process situation-specific functions F that are most frequently used in the respective situation are presented to the vehicle user N in the respective parking process situation PVS in individual steps of the course of the parking process situation PVS, i.e., for example in the form of inputs to be chosen directly. This is advantageous, in particular, when operating from outside, i.e., from outside the vehicle 1, because then the operating elements of the vehicle 1 are not available to the vehicle user N. The shortcuts are then displayed to him for selection on the remote-control unit 5.

In a further variant, in the respective parking process situation PVS, default values frequently used for the individual steps in the course of the parking process situation PVS when operating individual vehicle-specific or parking process situation-specific functions F are presented to the vehicle user N, i.e., one or more parameter values of the respective vehicle-specific or parking process situation-specific function F that were most frequently used in the past in the predetermined parking process situation PVS are presented to the vehicle user N for activation. In a further variant, the respective vehicle-specific or parking process situation-specific function F is automatically activated in the respectively learned configuration. In one embodiment, this automatic activation, however, only takes place after a request, i.e., only after confirmation by the vehicle user N.

When remote parking, i.e., with a so-called remote control of the vehicle 1, for example in a parking process carried out by means of the remote-control unit 5, commands are transmitted to the vehicle 1 via a wireless data transfer connection, in particular via a radio interface. For example, several wireless data transfer connections, in particular radio connection, are available, for example WLAN, mobile communication, or a communication via the vehicle key. Knowing in advance about possible data transfer methods can help to choose vehicle-specific or parking process situation-specific functions F when, later, a communication via the wireless data transfer connections is no longer possible. For example, a data transfer then already takes place on a server before driving into the garage G. Furthermore, in this way, possible communication problems can be pointed out ahead of time, for example if, after closing the garage door, the garage door can no longer be opened by a vehicle-specific or parking process situation-specific function F. In order to enable an optimal support, it is thus preferably learned in the method, in which steps of the respective parking process situation PVS at a certain position which data transfer connections or channels are available. Preferably, the best data transfer connection available in each step is selected. Advantageously, the support of the vehicle user N in one step is adjusted to data transfer connection possibilities in the following steps during the parking process situation PVS.

The following, for example, can be considered as vehicle-specific or parking process situation-specific functions F:
activating a locking device of a parking space, for example by means of a garage door opener,
activating at least one heating device or ventilating device of the vehicle 1, for example a seat heating or seat ventilation,
activating at least one climate control device of the vehicle 1,
activating at least one ventilating device of the vehicle 1,
activating at least one lighting device of the vehicle 1 or activating a delay of the deactivation of the lighting device in order to achieve a delay of the lighting, for example,
setting at least one predetermined parameter of at least one drive motor component or at least one brake device of the vehicle 1, for example setting a driving mode, for example quiet driving, in a fully electric operation in a hybrid vehicle,
activating a parking heating of the vehicle 1 or adjusting at least one parameter of the parking heating,
activating a covering mechanism of the vehicle 1 in order to open or close the cover,
activating an adjusting mechanism at least of a window element of the vehicle 1 in order to open or close one, several or all windows of the vehicle 1,
activating a predetermined seat adjustment of a vehicle seat of the vehicle 1,
activating a predetermined mirror adjustment at least of a rear-view mirror of the vehicle 1,
activating a locking system of the vehicle 1 in order to unlock or lock the vehicle 1,
activating or deactivating a prepared state of the vehicle 1.

In terms of activating a locking device of a parking space, for example by means of a garage door opener, it should be noted that operating commands to open different garage doors are often stored in vehicles 1. It can be determined by the parking process situation PVS, which is characterized in particular by the criterion K of the position KP, i.e., by location information, which garage door and thus which stored command is relevant and has to be activated or with which command the locking device of the respective parking space has to be activated.

Figure 3:
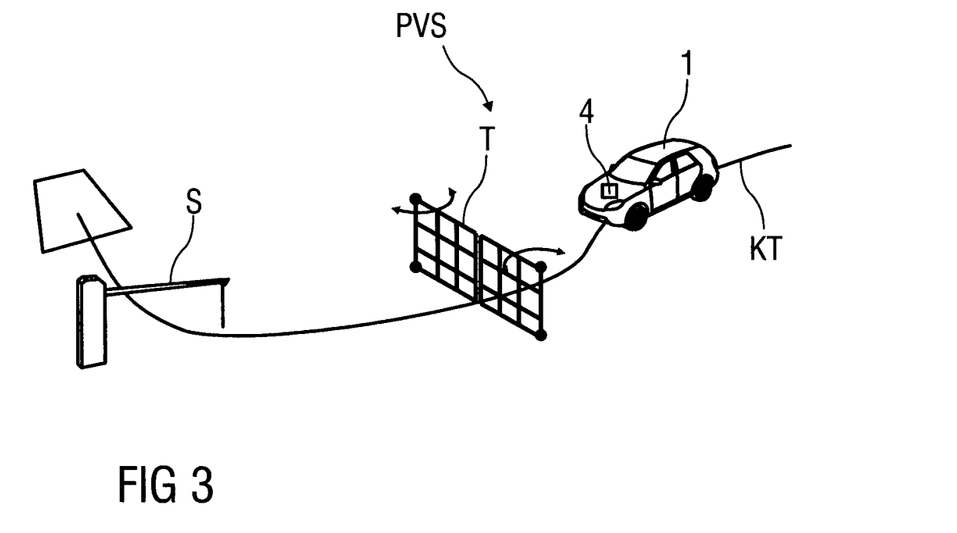
Figure 4:
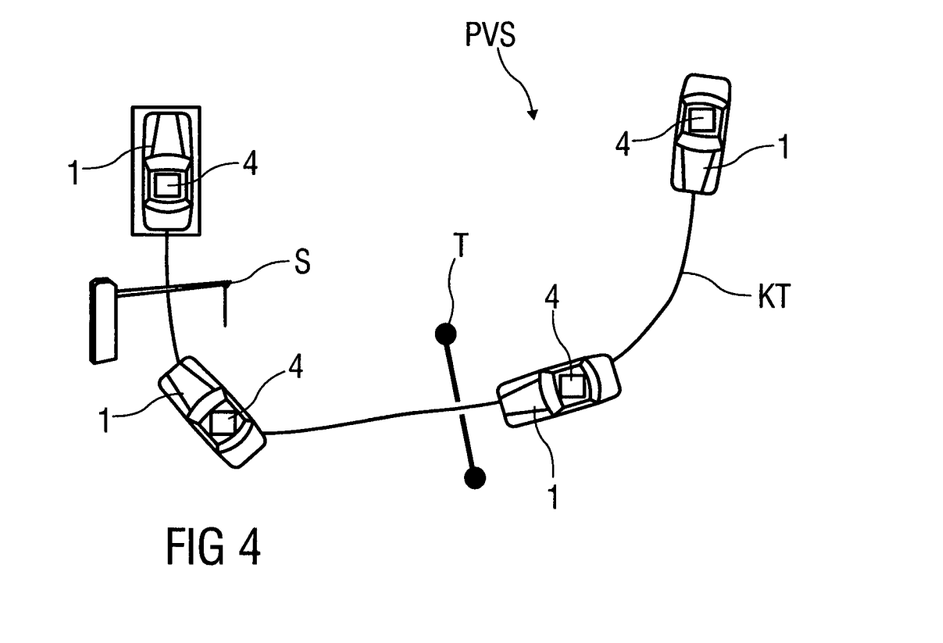

In FIGS. 3 and 4, a further parking process situation PVS is depicted that comprises a parking process of the vehicle 1 for pulling into a parking space along a predetermined parking trajectory KT, wherein at least one locking device is arranged along this parking trajectory KT that is to be opened first before the vehicle 1 can continue travelling along the parking trajectory KT. In the example shown here, two such locking devices are present, for example, a door T and a barrier S. Alternatively or additionally, other locking devices are also possible, for example in the form of a garage door or in the form of a barrier that can be lowered. The locking device formed as a door T, for example as a pivoting door, is formed, for example, as a remote controllable access restriction. The barrier S has a RFID transmitting or receiving unit, for example, for example in the form of a RFID reading device. The vehicle 1 has a RFID transmitting or receiving unit, for example, formed as a so-called RFID tag, which can be read by the RFID of the reading device of the barrier S. When the vehicle 1 approaches the barrier S, the RFID transmitting or receiving device of the barrier S and of the vehicle 1 communicate with each other, whereupon the barrier S opens.

In the method, the parking trajectory KT is driven along at least once in the training process L. The vehicle 1 is stopped in front of the locking device to be respectively opened. With the door T, activating the respective locking device takes place via a user interface suitable for a vehicle or a separate device, for example in the form of a garage door opener or in the form of a mobile telephone with a corresponding user interface, i.e., the door T is opened in a remote-controlled manner. With the barrier S, the vehicle 1 is only stopped in front of the barrier S and waits, because the communication between the two RFID transmitting or receiving units, when these are in transmitting or receiving range from each occurs place automatically and the barrier S is then opened automatically. This stopping of the vehicle 1 in front of the locking devices and activating the locking device formed as a door T by means of the corresponding interface that has to be actively controlled, i.e., working as an active remote control to be activated, is in each case allocated to the parking process situation PVS as a predetermined vehicle specific or parking process situation-specific function F, and stored with the respective position KP on the parking trajectory KT, preferably in the form of location coordinates.

In the depicted example, two trajectory occurrences are thus stored as predetermined vehicle-specific or parking process situation-specific functions F after finishing the training process L: stopping the vehicle 1 in front of the door T, combined with opening the door T by means of the user interface that works as a remote operation, and stopping the vehicle 1 in front of the barrier S. Indeed, with the barrier S that is to be opened by means of RFID technology, no active remote-operation activation is required, yet it is worthwhile to also store such trajectory occurrences as a predetermined vehicle-specific or parking process situation-specific function F to enable a distinction from an obstacle that suddenly occurs.

As a predetermined vehicle-specific or parking process situation-specific function F, in order to stop the vehicle 1 in front of the respective locking device, the corresponding adjusting, for example, of a predetermined parameter of a drive motor component or a brake device of the vehicle 1 is stored, i.e., when this predetermined vehicle-specific or parking process-specific function F is subsequently reactivated, then the one drive motor component or the one brake device are adjusted in such a way that the vehicle 1 stops, for example by correspondingly activating the brake device. Opening the door T by means of the user interface acting as a remote operation is stored as a predetermined vehicle-specific or parking process specific function F in the form of activating this locking device such that, when this predetermined vehicle-specific or parking process-specific function F is subsequently reactivated, the user interface that acts as the remote operation for the door T is automatically activated.

These attributed trajectories then serve as a template for the vehicle 1 when subsequently automatically driving away. The parking trajectory KT can subsequently be driven away fully automatically, for example. For this purpose, the parking trajectory KT is selected by the vehicle user N, for example, or recognized as the predetermined parking process situation PVS when the vehicle 1 is located at the start of the parking trajectory KT, for example. After starting autonomously driving along the parking trajectory, the learned trajectory is driven along completely autonomously by the vehicle 1. Because of the learned vehicle-specific or parking process situation-specific functions F, supplemented, for example, by further current vehicle surroundings information the vehicle 1 is respectively stopped at a safe distance from the respective locking device. In other words, a predetermined parameter of a drive motor component or a brake device of the vehicle 1 is adjusted as the vehicle-specific or parking process situation-specific function F in such a way that the vehicle 1 stops, for example by activating the brake device.

In this way, in the example depicted here, the vehicle 1 is first stopped at a safe distance in front the remote-operable door T. Now, the locking device formed as the remote-operable door T, as the further vehicle-specific or parking process-specific function F, is activated by means of the user interface acting as the remote control, i.e., the remote control for the door T is activated. As soon as it is detected by means of the vehicle surroundings information, which has been detected by means of a corresponding surroundings detection device of the vehicle 1 and corresponding sensor units, that the door T is open, then the fully autonomous driving along the parking trajectory KT is continued.

After driving through the door T, the locking device formed as the door T can be activated for closing by a corresponding activation of the user interface, when it has been learned and stored in the training process L as the further vehicle-specific or parking process-specific function F. On reaching the barrier S, a predetermined parameter of a drive motor component or a brake device of the vehicle 1 is again set as the predetermined vehicle-specific or parking process situation-specific function F in such a way that the vehicle 1 stops, for example by activating the brake device. Here, no further predetermined vehicle-specific or parking process-specific function F is required, since the barrier S is open after an automatic communication of the two RFID transmitting and receiving units.

As soon as it is detected by means of the vehicle surroundings information, which has been recorded by means of a corresponding surroundings detection device of the vehicle 1 and corresponding sensor units, that the door T is open, the fully autonomous driving along the parking trajectory KT is now continued up to the target position in the parking space. As sensor units, the surroundings detection device of the vehicle 1 preferably has a stereo camera or a radar sensor unit. In this embodiment of the method, fully autonomous parking processes of the vehicle 1 along the parking trajectory KT are thus also enabled with one or more locking devices. Partially autonomous parking processes are also made simpler since a safer stop of the vehicle 1 in front of such locking devices and preferably an automatic activation of the locking devices is enabled.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle in a parking process situation, the method comprising:
   allocating a predetermined vehicle-specific or parking process situation-specific function to at least one predetermined parking process situation of the vehicle;
   determining whether the vehicle is in the at least one predetermined parking process situation, and
   when the vehicle is in the at least one predetermined parking process situation
      presenting the predetermined vehicle-specific or parking process situation-specific function allocated to the at least one predetermined parking process situation to a vehicle user for activation, or automatically activating the predetermined vehicle-specific or parking process situation-specific function allocated to the at least one predetermined parking process situation, wherein one of the functions allocated to the predetermined parking process situation as the predetermined vehicle-specific or parking process situation-specific function is activating a locking device of a parking space and at least one of the following additional functions is allocated to the predetermined parking process situation:

activating a heating device, climate control device, or ventilating device of the vehicle, activating a lighting device of the vehicle or activating a delay of the deactivation of the lighting device, activating a parking heater of the vehicle or setting a parameter of the parking heater, activating a covering mechanism of the vehicle, activating a setting mechanism of a window element of the vehicle, activating a predetermined seat setting of a vehicle seat of the vehicle, and activating a predetermined mirror setting of a rear-view mirror of the vehicle.

2. The method of claim 1, wherein the allocation of the predetermined vehicle-specific or parking process-specific function to the at least one predetermined parking process situation of the vehicle performed in a training process, wherein the training process comprises at least one of the following steps:

storing the at least one predetermined parking process situation and the at least one activation of the vehicle-specific or parking process-specific function carried out in the at least one predetermined parking process situation in a learning mode activated by a vehicle user, storing the at least one predetermined parking process situation occurring several times and the one predetermined activation of a vehicle-specific or parking process situation-specific function carried out in every parking process situation that occurs, and predetermining the at least one predetermined parking process situation and the one allocated predetermined vehicle-specific or parking process situation-specific function and storing these predeterminations.

3. The method of claim 1, wherein one or more parameters of the one vehicle-specific or parking process situation-specific function used most frequently in the past in the at least one predetermined parking process situation is presented to the vehicle user for activation when the vehicle is in the at least one predetermined parking process situation.

4. The method of claim 1, wherein the predetermined vehicle-specific or parking process situation-specific function allocated to the at least one predetermined parking process situation is activated after confirmation by a vehicle user.

5. The method of claim 1, wherein the at least one predetermined parking process situation comprises at least one or more of the following criteria:

position of the vehicle, time point or time period of the at least one predetermined parking process situation, vehicle user identification, position of a vehicle user, current or predicted weather information, vehicle surroundings information, and parking trajectories.

6. The method of claim 1, wherein one of the following is allocated as the predetermined vehicle-specific or parking process-specific function of the at least one predetermined parking process situation:

setting a predetermined parameter of a drive train component or a brake device of the vehicle.

7. The method of claim 1, wherein a wireless data transfer connection is used to detect the at least one predetermined parking process situation or to activate the predetermined vehicle-specific or parking process situation-specific function.

8. The method of claim 7, wherein when a plurality of available wireless data transfer connections are available for the at least one predetermined parking process situation, the data transfer connection most suited to the predetermined parking process situation is used.

9. The method of claim 1, wherein a plurality of predetermined vehicle-specific or parking process situation-specific functions are allocated to the predetermined parking process situation of the vehicle in such a way that, when the vehicle is in the at least one predetermined parking process situation, some of the plurality of predetermined vehicle-specific or parking process situation-specific functions are presented to the vehicle user for activation during a course of the predetermined parking process situation in several steps one after another or are automatically activated.

10. The method of claim 1, wherein one or more of the following functions are allocated to the predetermined parking process situation as the predetermined vehicle-specific or parking process situation-specific function in addition to the at least two functions:

activating a locking system of the vehicle; and activating or deactivating a prepared state of the vehicle.

11. A device, configured to:

allocate a predetermined vehicle-specific or parking process situation-specific function to at least one predetermined parking process situation of the vehicle;

determine whether the vehicle is in the at least one predetermined parking process situation, and when the vehicle is in the at least one predetermined parking process situation present the predetermined vehicle-specific or parking process situation-specific function allocated to the at least one predetermined parking process situation to a vehicle user for activation, or automatically activate the predetermined vehicle-specific or parking process situation-specific function allocated to the at least one predetermined parking process situation, wherein one of the functions allocated to the predetermined parking process situation as the predetermined vehicle-specific or parking process situation-specific function is activating a locking device of a parking space and at least one of the following additional functions is allocated to the predetermined parking process situation:

activating a heating device, climate control device, or ventilating device of the vehicle, activating a lighting device of the vehicle or activating a delay of the deactivation of the lighting device, activating a parking heater of the vehicle or setting a parameter of the parking heater, activating a covering mechanism of the vehicle, activating a setting mechanism of a window element of the vehicle, activating a predetermined seat setting of a vehicle seat of the vehicle, and activating a predetermined mirror setting of a rear-view mirror of the vehicle.

12. The device of claim 11, wherein one or more of the following functions are allocated to the predetermined parking process situation as the predetermined vehicle-specific or parking process situation-specific function in addition to the at least two functions:

activating a locking system of the vehicle; and
activating or deactivating a prepared state of the vehicle.

* * * * *